Patented Dec. 27, 1949

2,492,735

UNITED STATES PATENT OFFICE 2,492,735

FIRMING AGENT AND METHOD OF USING SAME

Charles R. Conard, Ferguson, and Hugh C. Bertsch, St. Louis, Mo., assignors to Mallinckrodt Chemical Works, St. Louis, Mo., a corporation of Missouri No Drawing. Application October 19, 1945, Serial No. 623,454

5 Claims. (Cl. 99—186)

This invention relates to firming agents, and more particularly to a firming agent for use in canning vegetables and fruits.

Among the objects of this invention are the provision of an improved firming agent; the provision of an improved method for canning fruits and vegetables; the provision of a firming agent which may be tableted and stored over extensive periods of time; the provision of particular forms of firming agents suitable for use by canners; and, the provision of an improved firming agent and method of using it, which is more easily practiced by canners. Other objects will be in part apparent and in part pointed out hereinafter.

This invention accordingly comprises the ingredients and combinations of ingredients, the proportions thereof, steps and sequence of steps, and features of composition and synthesis, analysis, or metathesis, which will be exemplified in the products and processes hereinafter described, and the scope of the application of which will be indicated in the following claims.

It has been customary in the past in canning tomatoes and other fruits and vegetables to carry out the canning process so as to have as large a proportion of the product as firm as possible. The quality of certain canned fruits and vegetables is judged, among other things, by the proportion of the product which after canning remains firm. The standard test for determining this factor for tomatoes is to pour the contents of a can on a two-mesh sieve, let it drain for two minutes and weigh the food remaining on the sieve. The heavier the residue the firmer the product.

It is known that the firmness of canned fruits and vegetables may be improved by the addition of a relatively small proportion of calcium chloride. Such calcium chloride addition has been approved up to 0.07% by weight for tomatoes by the Food and Drug Administration, and is practiced by a number of canners. The calcium chloride is customarily tableted with sodium chloride in the proportion of approximately one part of calcium chloride to four parts of sodium chloride by weight and the resulting tablets are then merely dropped into a can during the canning operation. The amounts of calcium and sodium chloride in a tablet are adjusted to give the proper proportion of calcium chloride and sodium chloride in a particular size can.

The calcium chloride is sometimes incorporated into the canned fruits and vegetables in other ways, as by adding the calcium chloride to the juice solution in which the product is packed, or by soaking the product in a calcium chloride solution or by adding the powdered salt as in the treatment of berries. The most convenient method, however, for tomatoes is to drop a tablet of the proper size and composition into the can.

The tablets containing calcium chloride and sodium chloride heretofore employed have been subject to important disadvantages. These tablets are highly hygroscopic and not only absorb moisture, but this takes place to such an extent that after a relatively short period of storage they may disintegrate entirely. This makes mechanical feeding difficult, even under the most favorable circumstances, and in addition makes it impractical for a canner to purchase and store quantities of the tablets over any substantial period of time. This is true even though the tablets remain in their original container, since after a storage period of as short as six months it is not uncommon to find the tablet disintegrated to a granular caked mass in the original unopened container. Similar difficulties are encountered with other solid compositions containing calcium chloride.

According to the present invention a firming agent is provided utilizing as the firming ingredient a basic calcium chloride. The basic calcium chloride of the present invention is apparently a definite chemical combination which may be written as $Ca(OH)Cl \cdot \frac{1}{2}H_2O$. It can be considered as calcium chloride in which one chlorine atom has been replaced by a hydroxyl group. When added to water this basic calcium chloride forms calcium chloride and calcium hydroxide. It is soluble in solutions of many acids.

The basic calcium chloride of the above composition is remarkable for its lack of hygroscopicity. When it is exposed to air of 60% relative humidity at 75° F., no gain in weight is observed. At high humidity some gain in weight takes place, but moisture is picked up very slowly compared with either normal calcium chloride or calcium hydroxide and the basic salt does not liquify or become soft and spongy. Tablets containing four parts of sodium chloride and one part of basic calcium chloride have been exposed to a laboratory atmosphere of higher than average humidity and have shown no signs of disintegration or loss of physical strength.

If preferred, in lieu of forming tablets of the basic calcium chloride the white crystalline powder may be used as such and fed from a machine into each can in the desired proportion.

For most purposes however, a tablet comprising sodium chloride and basic calcium chloride is preferred, not only for ease of application, but because sodium chloride is customarily added during the canning operation for flavoring.

The use of basic calcium chloride in canning fruits and vegetables does not introduce a new constituent into the pack. The tablets provide the customary sodium and chlorine ions from the sodium chloride, while the basic calcium chloride forms calcium ions, chloride ions and hydroxyl ions. The hydroxyl ions, however, are quickly neutralized by the acids normally found in the products. The pH of the tomato pack, e. g., is slightly decreased, the change amounting to about 0.15 unit. The customary calcium chloride tablets increase the acidity by about 0.1 to 0.2 unit.

The raw materials for preparing basic calcium chloride of the present invention are calcium chloride, lime, and water. Anhydrous calcium chloride or any of its hydrates, and either hydrated or quicklime may be used. The following is a typical example of the preparation:

In a small pony mixer are placed water (7 pounds 10 ounces), and calcium chloride dihydrate (14 pounds 11 ounces). The mass is stirred until almost all of the chloride is dissolved and then hydrated lime (10 pounds 12 ounces) is added in small portions with continuous mixing. After a homogeneous mixture is obtained the product is dried on stainless steel trays in a steam cabinet drier using low pressure steam. The dried material is then crushed and sifted. Basic calcium chloride of the formula $Ca(OH)Cl \cdot \tfrac{1}{2}H_2O$ containing a slight excess of lime is obtained. The product is substantially non-hygroscopic and remains free-flowing and dry under normal atmospheric humidities. It may be stored at room temperature in a relative humidity of 60% over an extremely long period of time without picking up a substantial amount of moisture.

The reaction product apparently contains a definite chemical compound of the composition given above together with a small excess of lime. The basic compound is substantially non-hygroscopic under normal humidities and at normal temperatures. If it is subjected to very high humidities, it will pick up water, but this will be lost when the humidity subsequently falls.

The mixture of the basic compound referred to with increasing proportions of lime increases the hygroscopicity of the mixture proportionately to the amount of excess lime. Apparently, the increase in hygroscopicity is due to the lime present in the mixture. An excess of calcium chloride also increases the hygroscopicity of the mixture, apparently due to the affinity of the calcium chloride for water.

The basic calcium chloride of the present invention may be tableted with sodium chloride in the usual way to form tablets containing the desired proportion and amount of both ingredients for a particular sized can. For canning tomatoes, a tablet formed with approximately 20% by weight basic calcium chloride of the above composition and 80% sodium chloride was used. The firming action of this tablet was comparable to that obtained with a similar tablet formed from normal calcium chloride and sodium chloride, but tablets containing the basic calcium chloride were substantially non-hygroscopic at normal temperatures and at even relatively high humidities.

In view of the above, it will be seen that the several objects of the invention are achieved and other advantageous results attained.

As many changes could be made in the above process and products without departing from the scope of the invention, it is intended that all matter contained in the above description shall be interpreted as illustrative and not in a limiting sense.

We claim:
1. The method of canning fruits and vegetables which comprises adding to the product to be canned during the canning operation basic calcium chloride having the formula,

$$Ca(OH)Cl \cdot \tfrac{1}{2}H_2O$$

and having approximately the following composition: calcium, 39%; chlorine, 35%; hydrogen, 2% and oxygen, 24%, all by weight.

2. The method of canning tomatoes which comprises adding to the tomatoes during the canning operation basic calcium chloride having the formula, $Ca(OH)Cl \cdot \tfrac{1}{2}H_2O$ and having approximately the following composition: calcium, 39%; chlorine, 35%; hydrogen, 2% and oxygen, 24%, all by weight.

3. The method of canning fruits and vegetables which comprises adding to a can of the product to be canned during the canning operation a proportion of basic calcium chloride having the formula, $Ca(OH)Cl \cdot \tfrac{1}{2}H_2O$ and having approximately the following composition: calcium, 39%; chlorine, 35%; hydrogen, 2% and oxygen, 24%, all by weight, such that the resulting can contains a concentration of calcium chloride not substantially in excess of 0.07%.

4. The method of canning tomatoes which comprises adding to a can of tomatoes during the canning operation a proportion of basic calcium chloride having the formula, $$Ca(OH)Cl \cdot \tfrac{1}{2}H_2O$$

and having approximately the following composition: calcium, 39%; chlorine, 35%; hydrogen, 2% and oxygen, 24%, all by weight, such that the resulting can contains a concentration of calcium chloride not substantially in excess of 0.07%.

5. Substantially non-hygroscopic basic calcium chloride having approximately the following composition: calcium, 39%; chlorine, 35%; hydrogen, 2% and oxygen, 24%, all by weight and having the formula, $Ca(OH)Cl \cdot \tfrac{1}{2}H_2O$.

CHARLES R. CONARD.
HUGH C. BERTSCH.

REFERENCES CITED

The following references are of record in the file of this patent:

UNITED STATES PATENTS

| Number | Name | Date |
|---|---|---|
| 1,282,188 | Catlett | Oct. 22, 1918 |
| 1,422,337 | Catlett | July 11, 1922 |
| 2,186,003 | Blair | Jan. 9, 1940 |
| 2,318,426 | Schroder | May 4, 1943 |
| 2,333,873 | Martin | Nov. 9, 1943 |
| 2,358,706 | Hoag et al. | Sept. 19, 1944 |

OTHER REFERENCES

Mellor, "Comprehensive Treatise on Inorganic and Theoretical Chemistry, vol. 3, 1923, pp. 716 and 717.

"National Can" February 1942, page 91.

Effect of Calcium Salts in Canning Tomatoes by M. Sigel, "The Canner," December 16, 1939.